United States Patent [19]

Windt

[11] 3,968,851

[45] July 13, 1976

[54] AUTOMATIC LIFT SYSTEM FOR AIR CUSHION VEHICLES

[76] Inventor: Robert James Windt, 1204 Third St., Box 281, Cordova, Ill. 61242

[22] Filed: Mar. 14, 1975

[21] Appl. No.: 558,347

[52] U.S. Cl. .................................................. 180/117
[51] Int. Cl.² ................................................. B60V 1/14
[58] Field of Search ................................ 180/116–130

[56] References Cited
UNITED STATES PATENTS

| | | | |
|---|---|---|---|
| 3,153,461 | 10/1964 | Bollum | 180/126 |
| 3,187,817 | 6/1965 | Colley | 180/117 X |
| 3,219,134 | 11/1965 | Bratt | 180/121 |
| 3,810,522 | 5/1974 | Morgan | 180/116 |

FOREIGN PATENTS OR APPLICATIONS

| | | | |
|---|---|---|---|
| 1,238,539 | 7/1971 | United Kingdom | 180/117 |

*Primary Examiner*—Robert R. Song
*Assistant Examiner*—Terrance L. Siemens

[57] ABSTRACT

An air cushion vehicle in which the lift fan and the propulsion unit are driven from the same engine in such a way as to automatically keep the lift fan at a constant speed to maintain correct lift while the engine and propulsion unit speed varies from just above idle up to maximum speed. The lift fan is driven by means of two automatically adjustable pulleys, one of which senses torque from the lift fan and adjusts its effective diameter, the other being adjusted by spring force.

12 Claims, 9 Drawing Figures

AUTOMATIC LIFT SYSTEM FOR AIR CUSHION VEHICLES

BACKGROUND OF THE INVENTION

1. Field of the Invention

This invention relates to air cushion vehicles involving skirted types and side wall types which obtain lift and propulsion from the same engine with the amount of lift being automatically controlled.

2. Description of the Prior Art.

An ordinary air cushion vehicle uses two engines to get proper control. One engine runs the lift fan independent from the other engine which runs the thrust fan. Both engines must be operating for the vehicle to perform properly. Therefore, this vehicle is less reliable than a single engine vehicle. The vehicle operator must manipulate two throttle levers to adjust lift and thrust to meet the requirements of changing conditions. The single engine vehicle uses only one throttle lever. The single engine vehicle is also quieter, lighter in weight and more economical on fuel than the twin.

A single engine hovercraft operating without the automatic lift system of this invention encounters problems and limitations in the course of operation. This type vehicle is generally set up so that at a cruise power setting the lift fan is turning at optimum or design speed. Upon application of full power, the lift fan is being driven at much higher speed than required. In the case of a high-performance vehicle, the lift fan would absorb much of the power which should go to the propulsion fan. Slowing this vehicle after a high-speed run will result in a lack of lift air to maintain the cushion and plowing in at speed. My present invention will maintain proper lift at any throttle position above idle.

Running a hovercraft into a headwind requires extra power for propulsion. The ordinary single engine hovercraft would have to develop too much lift for this case. Running downwind, the ordinary single engine hovercraft would plow in as a result of a lack of lift due to low propulsion requirements. The present invention overcomes this by maintaining essentially the same lift upwind or downwind.

The single engine hovercraft with a controllable pitch propeller is an improvement over the ordinary single engine hovercraft, but it too generally has two control levers; one for throttle control and the other for pitch control. On this type craft the engine must be running relatively fast to maintain lift even though very little propulsion is desired. On the present invention, the engine may be run slow when full lift and very little propulsion is desired. This is due to the drive ratios of the automatic lift system as will be explained later.

The single engine hovercraft of this invention is less expensive to build than a twin engine vehicle because the cost of the automatic lift unit is less than that of a lift engine. Noise is also decreased by elimination of the lift engine because lift engines for small vehicles are usually two-cycle air cooled engines which are known to be noisy. The need for two different types of fuel (two cycle and four cycle) is also eliminated.

SUMMARY OF THE INVENTION

This invention relates to an air cushion vehicle which runs both the lift and propulsion fans from the same engine in such a way as to provide proper lift automatically and maintain this lift through the entire speed range of the engine, except at idle.

The object of the invention is to provide lift and propulsion independent of each other from the same engine. Once the engine is above idle, full lift is obtained with very little propulsive force. As the throttle is advanced, the speed of rotation of the propulsion unit is increased and therefore the propulsive force is also increased, but the lift fan maintains essentially a constant speed. Control of the vehicle is simplified by use of only one throttle or speed control lever. These and other objects, features and advantages will become apparent from the following description with reference to the accompanying drawings.

DESCRIPTION OF PREFERRED EMBODIMENT

Figure 1:
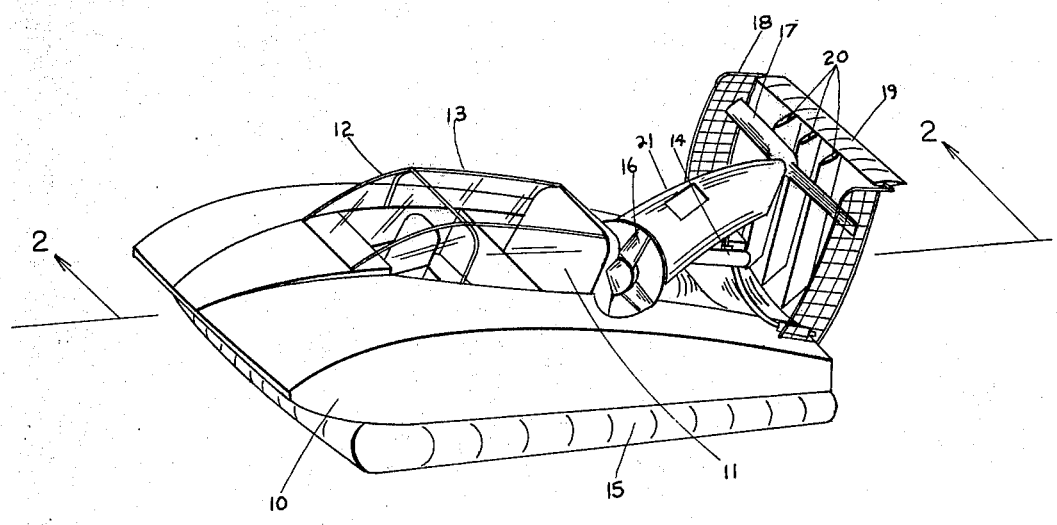
FIG. 1 is a perspective view of an air cushion vehicle according to the presently preferred embodiment of the present invention.

The preferred embodiment of the air cushion vehicle of this invention is shown in FIG. 1 and consists of a body 10 which contains a passenger compartment 11 or space for cargo, a windshield 12 and canopy top cover 13, and an engine 14. Attached around the perimeter of the body 10 is the flexible skirt 15, which contains the lift air and determines the hovering height.

The engine 14 drives the lift fan 16 and the propulsion fan 17. At the aft part of the body 10, the fan guard 18 supports the trim elevator 19. The aft rudders 20 are supported at the top by the trim elevator 19 and at the bottom by the body and are used for steering the craft. The engine cover 21 is used to keep water off the engine and its components.

Figure 2:
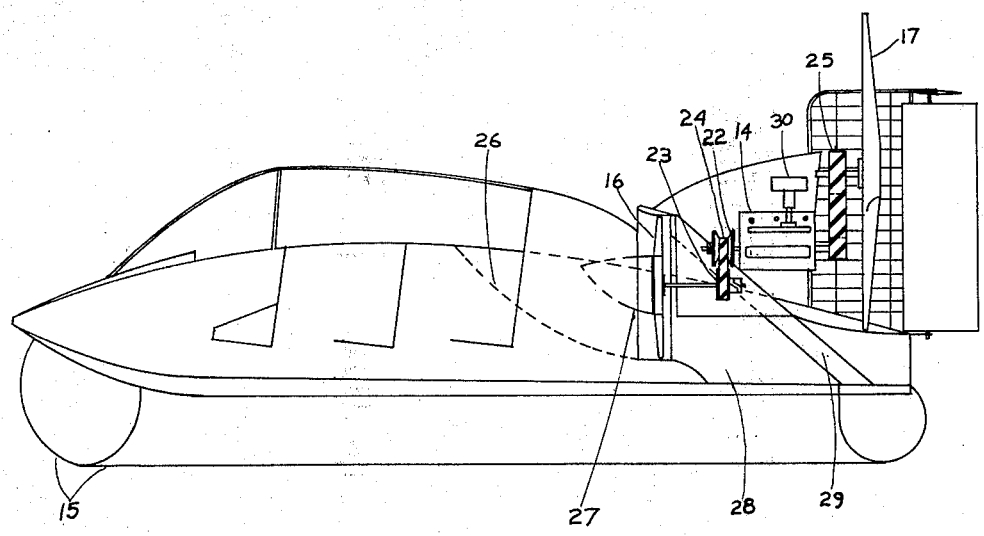
FIG. 2 is a cross-sectional side view of the vehicle taken along the plane 2—2 in FIG. 1.

In FIG. 2, the engine 14 drives the lift fan 16 through the automatic lift system which consists of a spring loaded pulley 22 which is driven by the engine 14, a torque sensing pulley 23 which drives the lift fan 16, and a belt 24 to transfer power between the two pulleys. The propulsion fan 17 is driven through a reduction belt drive system 25 which enables the use of a large slow turning fan to reduce noise and increase thrust.

Lift air flows into the air intake 26 and is directed to the lift fan 16 by the centerhub 27 and then flows down the lift air duct 28 and also down the skirt air duct 29 and into the flexible skirt 15 for vehicles using bag skirts.

A good air filter 30 is used to protect the engine from the dusty environment the vehicle sometimes encounters.

There are many other ways the above cited parts of the vehicle can be arranged, using the same automatic lift system. For example, the propulsion fan 17 can be attached directly to the engine 14 or a ducted fan can be used for propulsion. The lift fan can be run in a horizontal plane by use of a right-angle gear box. The lift fan 16 and the automatic lift pulleys 22 and 23 can be placed at the front of the vehicle which would make it easier to lower the engine 14 and thereby lower the center of gravity of the vehicle. Multiple engines, each driving an automatic lift system and propulsion fan, can be employed for extra reliability. In case one engine failed the vehicle could continue on its route at a good speed with the remaining engine or engines operating. A cover would have to be placed over the air intake 26 of the failed engine to prevent the escape of lift air.

Figure 3:
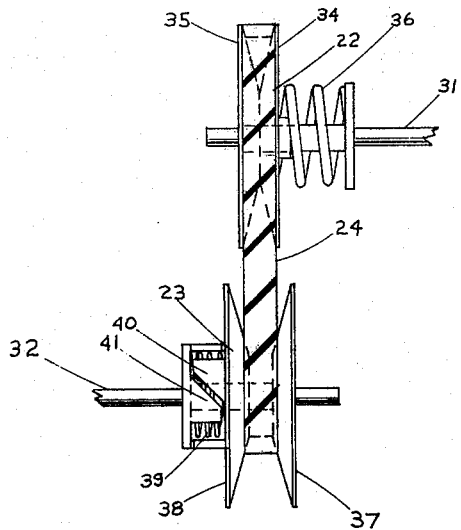
FIG. 3 is a side view of the automatic lift unit in the position it takes when the engine is not running or when it is running at idle or low speed.

In FIG. 3 the automatic lift system which is composed of a spring loaded pulley 22 mounted on the power shaft 31, a torque sensitive pulley 23 mounted on the lift fan shaft 32 and a belt 24 to transfer power between the two pulleys 22 and 23 is shown in the position it takes when the engine 14 is running at low speed (1500 RPM or less for this particular craft), or when the engine 14 is stopped. In this case the lift fan shaft 32 is turning about 1.7 times as fast as the engine 14 and thereby producing full lift (2500 RPM lift fan speed) when the engine 14 is running at 1500 RPM. When the engine 14 is at idle, about 700 RPM, the lift fan 16 is turning about 1200 RPM which is not nearly enough to lift the vehicle. But when the engine speed reaches 1200 RPM (lift fan speed of 2000 RPM), the vehicle lifts off and hovers.

Since these types of pulleys are used extensively on recreational vehicles, particularly on snowmobiles, and can be purchased commercially, I will confine the discussion only to the essential parts of these pulleys. In FIG. 3, plate 34 is held against plate 35 by a strong spring 36 which causes the belt 24 to ride at the top of the pulley 22 and thereby causes the movable plate 38 on the torque sensitive pulley 23 to separate from plate 37 against the force of a light spring 39. In this position, the lift fan shaft 32 is turning about 1.7 times as fast as the power shaft 31.

Figure 4:
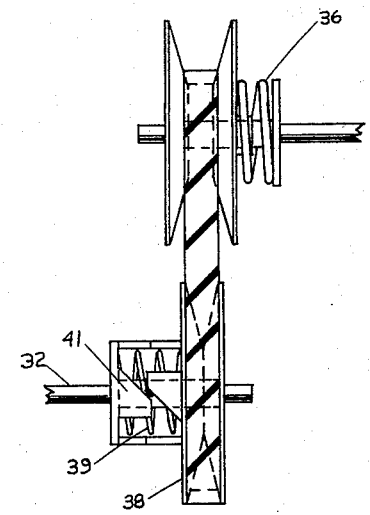
FIG. 4 is a side view of the automatic lift unit in the position it takes when the engine is at maximum speed.

Any lift fan has a definite torque RPM relationship (greater lift fan speed means greater torque required). So when the lift fan is running at 2500 RPM, the torque in the lift fan shaft 32 is enough to cause the torque sensitive pulley 23 to increase its effective diameter by moving plate 38 toward plate 37. Plate 38 has a bushing which permits sliding and rotation independent of plate 37. About half the torque from lift fan shaft 32 is transferred to plate 38 through cam 41 and into bracket 40 which is attached to plate 38. Since the cams are at some angle other than 0° or 90° to the plate 38, the torque in the lift fan shaft 32 will be converted to a force on plate 38 tending to push it toward plate 37. When this force is great enough to overcome the force of spring 36 then the effective diameter where the belt 24 rides in the torque sensitive pulley 23 will increase while the effective diameter of the spring loaded pulley 22 will decrease, thereby changing the drive ratio from the power shaft 31 to the lift fan shaft 32. In FIG. 4 the engine is at full throttle (about 4300 RPM in this case) while the lift fan shaft is still turning about 2500 RPM. The speed of the lift fan shaft 32 can be adjusted by changing or adjusting springs 39 or 36, or both, or by changing the angle of the cam 41 or by changing the springs and the cam together. A constant angle on cam 41 will result in a slight increase in lift fan shaft RPM as engine speed increases between 1500 and 4300 RPM. If the angle on cam 41 decreases as it approaches plate 38, then the RPM of the lift fan shaft 32 will remain constant as the engine RPM increases between 1500 and 4300 RPM. The decreasing angle results in more force in plate 38 to overcome spring tension which increases as the spring 36 is compressed. If the cam angle decreases even more as it approaches plate 38, the lift fan shaft speed will decrease slightly as the engine RPM increases between 1500 and 4300 RPM. This arrangement would be desirable for a vehicle which obtained some of its lift by aerodynamic means or by ram air dynamic pressure to assist the lift fan. In this case, more power is available for propulsion. It will also conserve fuel by using less power at a given speed.

Figure 5:
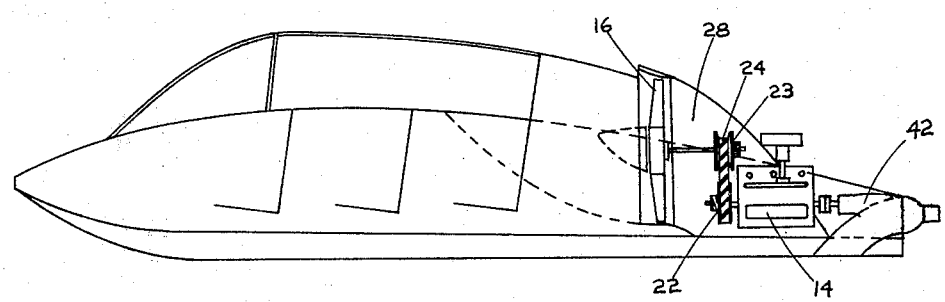
FIG. 5 is a cross-sectional side view of an air cushion vehicle using a water jet pump for propulsion.

FIG. 5 shows the automatic lift system consisting of spring-loaded pulleys 22, torque sensitive pulley 23 and belt 24, lift fan 16 and lift air duct 28 installed on an air cushion vehicle of the side wall type using a water propulsion system. The installation shown is a water jet pump 42, but any other conceivable propulsion may be used. The automatic lift system of this invention enables operation on a single engine 14 with a predetermined amount of lift and a variable speed propulsion drive depending on throttle position.

Figure 6:
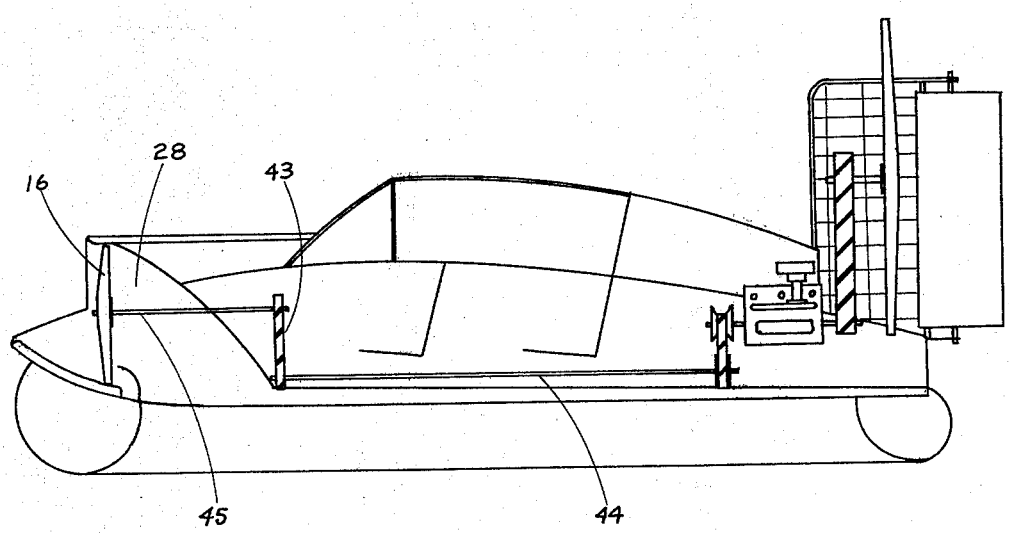
FIG. 6 is a cross-sectional side view of an air cushion vehicle using an automatic lift system and having the lift fan, air intake and lift air duct at the forward part of the vehicle.

In FIG. 6 the lift fan 16 and the lift air duct 28 are at the front of the vehicle. A power transfer unit 43 is used to transfer power from the lower shaft 44, which is driven by the automatic lift system, to the lift fan shaft 45. By having the lift system at the front of the vehicle high speed stability in pitching is improved. Better air flow is also provided to the lift fan 16.

Figure 7:
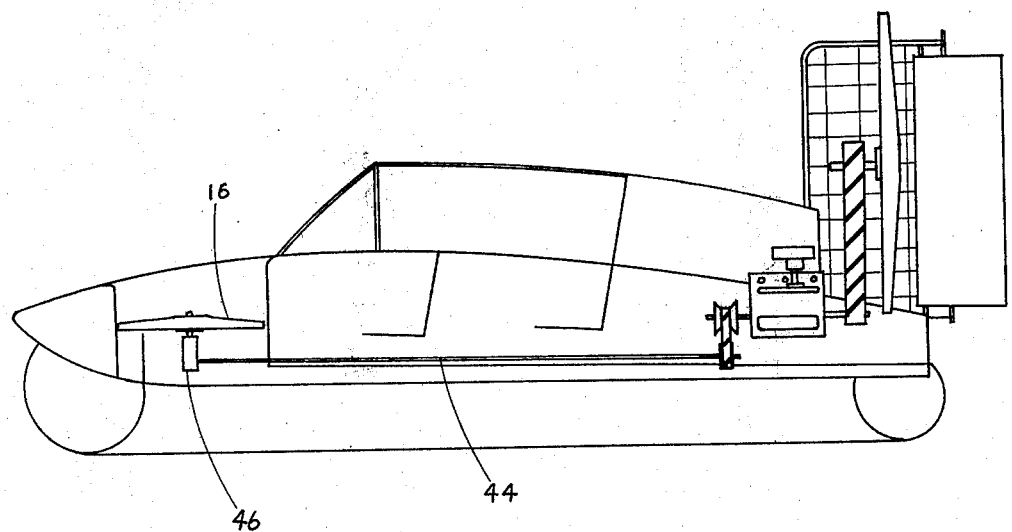
FIG. 7 is a cross-sectional side view of an air cushion vehicle using an automatic lift system and having the lift fan rotating in a substantially horizontal plane.

In FIG. 7 the lift fan 16 rotates in a horizontal plane and decreases noise by providing the lift fan 16 with a uniform flow of air. The lower shaft 44, which is driven by the automatic lift system, drives a right angle gear box 46 on which is attached the lift fan 16.

Figure 8:
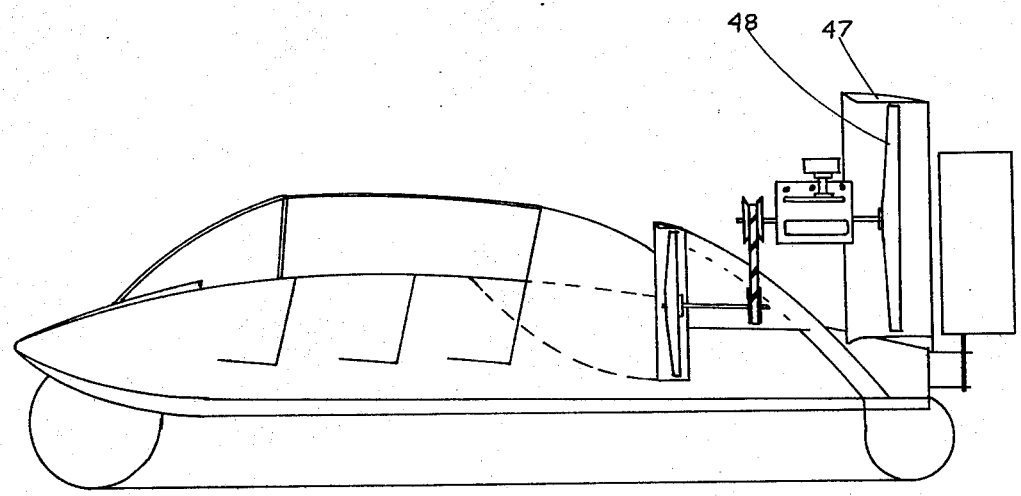
FIG. 8 is a cross-sectional side view of an air cushion vehicle using an automatic lift system and having a ducted fan propulsion unit.

A ducted fan propulsion unit consisting of an air duct 47 and a ducted fan 48 is shown in FIG. 8. A ducted fan is more efficient than a propulsion fan especially at low speeds. The ducted fan propulsion unit eliminates the need for belt driving the propulsion fan because ducted fans generally must turn at higher speeds for best efficiency. The automatic lift system functions the same as with a propulsion fan.

Figure 9:
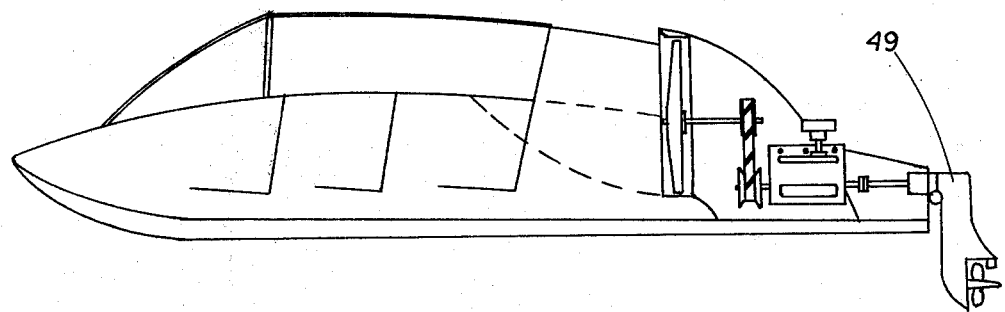
FIG. 9 is a cross-sectional side view of an air cushion vehicle of the sidewall type using an automatic lift system and having a water screw propeller propulsion unit.

FIG. 9 shows a water screw propulsion unit 49 on a sidewall type air cushion vehicle. The automatic lift system maintains constant lift air flow while the speed of the craft may be changed by changing the speed of the water screw propulsion unit.

Although the invention has been described with respect to particular preferred embodiments thereof, many changes and modifications will become apparent to those skilled in the art. The foregoing description was intended to be illustrative and not limiting of the invention.

I claim:

1. An air cushion vehicle comprising a body including at least one engine means for driving a lift fan and a propulsion unit, an air intake and lift air duct means for directing lift air to the underside of said vehicle wherein said lift fan is automatically kept running at the proper speed to maintain the correct amount of lift for said vehicle by means of two pulley wheels with movable face plates so as to adjust the effective diameter of these pulleys and a belt, one of the said pulley wheels being controlled by torque from the lift fan is attached to the lift fan shaft while the other pulley wheel having a spring means to close its face plate is attached to the engine output shaft or power shaft.

2. An air cushion vehicle as set forth in claim 1 wherein said lift fan, air intake and lift air duct are at the forward part of said vehicle.

3. An air cushion vehicle as set forth in claim 1 wherein said lift fan, air intake and lift air duct are at the aft part of the vehicle.

4. An air cushion vehicle as set forth in claim 1 wherein said lift fan rotates in a substantially vertical plane.

5. An air cushion vehicle as set forth in claim 1 wherein said lift fan rotates in a substantially horizontal plane.

6. An air cushion vehicle as set forth in claim 1 wherein said propulsion unit is an air propeller.

7. An air cushion vehicle as set forth in claim 1 wherein said propulsion unit is a ducted fan.

8. An air cushion vehicle as set forth in claim 1 wherein said propulsion unit is a water jet pump.

9. An air cushion vehicle as set forth in claim 1 wherein said propulsion unit is a water screw propeller.

10. An air cushion vehicle as set forth in claim 1 wherein said lift fan maintains a constant speed when said engine speed is changed.

11. An air cushion vehicle as set forth in claim 1 wherein said lift fan increases slightly in speed when said engine speed increases.

12. An air cushion vehicle as set forth in claim 1 wherein said lift fan decreases in speed when said engine speed increases.

* * * * *